US012212064B2

(12) United States Patent
Rahman et al.

(10) Patent No.: US 12,212,064 B2
(45) Date of Patent: Jan. 28, 2025

(54) METHODS AND APPARATUS FOR IMPLEMENTING ANTENNA ASSEMBLIES AND/OR COMBINING ANTENNA ASSEMBLIES TO FORM ARRAYS

(71) Applicant: Mixcomm, Inc., Chatham, NJ (US)

(72) Inventors: Syed Rahman, Parsippany, NJ (US); Arun Natarajan, Corvallis, OR (US); Harish Krishnaswamy, New York, NY (US)

(73) Assignee: Mixcomm, Inc., Chatham, NJ (US)

( * ) Notice: Subject to any disclaimer, the term of this patent is extended or adjusted under 35 U.S.C. 154(b) by 122 days.

(21) Appl. No.: 17/512,633

(22) Filed: Oct. 27, 2021

(65) Prior Publication Data

US 2022/0131277 A1 Apr. 28, 2022

Related U.S. Application Data

(63) Continuation of application No. PCT/US2021/056907, filed on Oct. 27, 2021.

(60) Provisional application No. 63/106,344, filed on Oct. 27, 2020.

(51) Int. Cl.
*H01Q 1/02* (2006.01)
*H01Q 1/12* (2006.01)
*H01Q 21/06* (2006.01)
*H01Q 21/24* (2006.01)

(52) U.S. Cl.
CPC ............. *H01Q 21/065* (2013.01); *H01Q 1/02* (2013.01); *H01Q 1/12* (2013.01); *H01Q 21/24* (2013.01)

(58) Field of Classification Search
CPC .......... H01Q 21/065; H01Q 1/02; H01Q 1/12; H01Q 21/24; H01Q 1/2283; H01Q 9/045; H01Q 1/523
USPC .......................................................... 343/893
See application file for complete search history.

(56) References Cited

U.S. PATENT DOCUMENTS 10,199,717 B2 * 2/2019 Rofougaran ......... H01Q 1/2283
10,418,703 B2 * 9/2019 Sazegar ............. H01Q 21/0087
10,784,563 B2 * 9/2020 Gu .......................... H01L 23/66
10,826,194 B2 * 11/2020 Gu .......................... H01L 23/66
(Continued)

FOREIGN PATENT DOCUMENTS

WO 2020200444 A1 10/2020

OTHER PUBLICATIONS

"Polarization," Erich Gugle, rfcec.com, Published Online Nov. 12, 2014, Accessed Online Aug. 16, 2023, http://rfcec.com/RFCEC/Section-3%20-%20Fundamentals%20of%20RF%20Communication-Electronics/07%20-%20ANTENNA/Antenna%20-%20Polarization%20Information%20(Extract%20from%20USMC%20MCI%202512H).pdf (Year: 2014).*
(Continued)

*Primary Examiner* — David E Lotter
(74) *Attorney, Agent, or Firm* — Straub & Straub; Michael P. Straub; Stephen T. Straub

(57) ABSTRACT

Methods and apparatus for implementing an arrangement of antennas in an apparatus are described. The combining of antennas and related components using Ball Grid Array (BGA) technology and various spacing/heat routing techniques allows for a group of antennas and related ICs to be implemented as a printed circuit board mountable package. Multiple antenna packages can be mounted on a printed circuit board to allow for different numbers of antennas to be included in a device depending on communications needs. The antenna package is well suited for mm-wave applications.

26 Claims, 9 Drawing Sheets

(56) References Cited

U.S. PATENT DOCUMENTS

| | | | | |
|---|---|---|---|---|
| 11,024,954 | B2 * | 6/2021 | Liu | H01Q 21/065 |
| 11,043,730 | B2 * | 6/2021 | Liu | H01L 23/3135 |
| 11,222,852 | B2 * | 1/2022 | Chiu | H01L 21/486 |
| 11,227,859 | B2 * | 1/2022 | Eid | H01L 23/42 |
| 11,251,538 | B2 * | 2/2022 | Lee | H01Q 21/0025 |
| 11,316,274 | B2 * | 4/2022 | Lin | H01L 23/315 |
| 11,699,855 | B2 * | 7/2023 | Kang | H01Q 1/2283 343/700 R |
| 2012/0280380 | A1 * | 11/2012 | Kamgaing | H01Q 21/0093 343/893 |
| 2015/0084814 | A1 * | 3/2015 | Rojanski | H01Q 21/065 342/368 |
| 2015/0288077 | A1 | 10/2015 | Friedman et al. | |
| 2016/0049723 | A1 * | 2/2016 | Baks | H01Q 9/0457 343/848 |
| 2019/0252796 | A1 * | 8/2019 | Mahanfar | H01Q 3/40 |
| 2019/0377392 | A1 | 12/2019 | Mani et al. | |
| 2020/0321711 | A1 | 10/2020 | Baek et al. | |
| 2020/0343629 | A1 * | 10/2020 | Kim | H01Q 21/065 |
| 2021/0005977 | A1 * | 1/2021 | Franson | H01Q 21/065 |
| 2021/0050650 | A1 * | 2/2021 | Chiu | H01L 23/3675 |
| 2021/0066814 | A1 * | 3/2021 | Kim | H01Q 1/2283 |
| 2021/0242601 | A1 * | 8/2021 | Johansson | H01Q 1/523 |
| 2022/0320020 | A1 * | 10/2022 | Hsu | H01L 21/56 |
| 2023/0085064 | A1 * | 3/2023 | Shi | H01Q 3/267 343/702 |
| 2023/0140655 | A1 * | 5/2023 | Onaka | H01Q 1/2283 343/702 |

OTHER PUBLICATIONS

International Search Report and Written Opinion of the International Searching Authority from PCT/US2021/056907, mail date Jan. 28, 2022 pp. 1-8.

* cited by examiner

METHODS AND APPARATUS FOR IMPLEMENTING ANTENNA ASSEMBLIES AND/OR COMBINING ANTENNA ASSEMBLIES TO FORM ARRAYS

RELATED APPLICATIONS

The present application claims the benefit of U.S. Provisional Application Ser. No. 63/106,344 filed Oct. 27, 2020 which is hereby expressly incorporated by reference in its entirety.

FIELD

The present application relates to antennas and more particularly to antennas, combinations of antennas to form antenna assemblies, and/or communications devices including a combination of antennas and/or antenna assemblies.

BACKGROUND

Antennas are often arranged into groups for transmission/reception purposes. Antenna arrays are an example of grouping of antennas for communications purposes. There is a growing interest in using antenna arrays to support millimeter (mm) wavelength communications. Many different types of devices may use an antenna array and the number of antennas in an array may vary from device to device depending on the device's capabilities and/or the space available for antennas.

While antenna arrays may be used in a wide variety of devices, mm-wave applications present various problems. In the case of mm-wave the small antenna size makes it challenging to get the same or similar pattern for multiple antennas placed in close proximity. In addition the small size of the antennas makes it difficult to integrate multiple integrated circuits (ICs), which are intended to work with the antennas, into a small space with the antennas in part because input/output to an array including multiple antennas may have mm-wave connections which can be challenging to include in a small package. In addition, when integrated circuits are combined with multiple antennas in an assembly it can be difficult to support good heat flow and heat dissipation of the heat generated by the ICs given the limited area available for heat transfer and routing of electrical connections.

In view of the above, it should be appreciated that there is a need for improved methods and/or apparatus for implementing an arrangement of antennas. It would be desirable if at least some of the new methods and/or apparatus addressed one or more of the problems associated with mm-wave antenna applications.

SUMMARY

Methods and apparatus for implementing an arrangement of antennas in an apparatus are described. The combining of antennas and related components using Ball Grid Array (BGA) technology and various spacing/heat routing techniques allows for a group of antennas and related ICs to be implemented as a printed circuit board mountable package. Multiple antenna packages can be mounted on a printed circuit board to allow for different numbers of antennas to be included in a device depending on communications needs. The package is well suited for mm-wave applications.

While various features discussed in the summary are used in some embodiments it should be appreciated that not all features are required or necessary for all embodiments and the mention of features in the summary should in no way be interpreted as implying that the feature is necessary or critical for all embodiments.

Numerous additional features and embodiments are discussed in the detailed description which follows.

DETAILED DESCRIPTION

In the Figures various embodiments and examples are provided to show different features which are found in one or more embodiments. All features need not be included in all embodiments. Elements which are the same or similar in the various figures included in this application are numbered the same to avoid the need to redescribe elements found in different embodiments which are the same or sufficiently similar that they could be easily interchanged.

Figure 1:
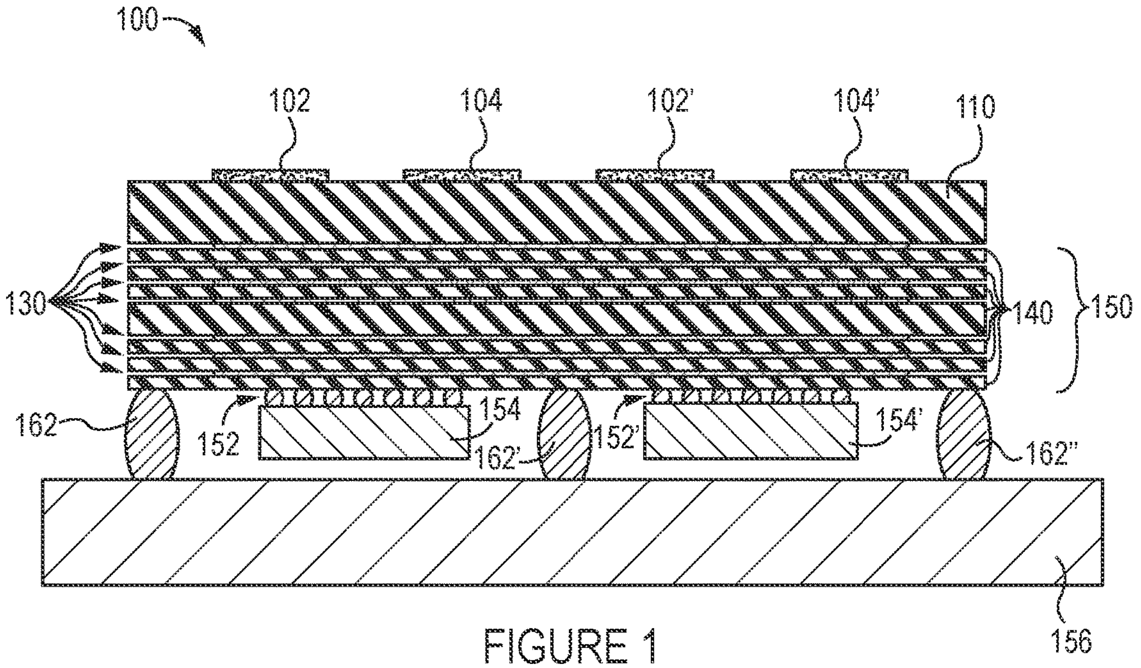
FIG. 1 illustrates an exemplary apparatus including multiple antennas and integrated circuits mounted on a printed circuit board incorporating features in accordance with a first embodiment.

FIG. 1 illustrates a side or cross-sectional view of an exemplary apparatus 100. The apparatus 100 includes multiple antennas 102, 104, 102', 104' and integrated circuits 154, 154' constructed using Ball Grid Array (BGA) technology mounted on a printed circuit board 156 and incorporating features in accordance with a first embodiment. The exemplary apparatus 100 includes an antenna and integrated circuit (IC) assembly which includes antennas 102, 104, 102' and 104' mounted to a dielectric antenna mounting layer 110 which is an antenna mounting layer positioned above a set 150 of layers identified by reference number 150. The set 150 of layers includes conductive layers 130 and dielectric layers 140. The conductive layers 130 have conductors printed on them allowing them to act as a printed circuit boards and to interconnect components mounted on various layers via electrical connections which extend though the dielectric layers 140. In the FIG. 1 embodiment the set 150 of conductive layers 130 and dielectric layers 140 to which integrated circuits 154, 154' are connected by conductors 152, 152' are supported by a lower set of balls, also referred to as bumps, 162, 162', 162" so that the integrated circuits 154, 154' are suspended over the printed circuit board 156. The conductors 152, 152' can be IC pins or other electrical interconnects which connect the individual IC to a conductor in one of the conductive layers 130. The IC can include amplifiers, control circuits, decoders, encoders and/or other circuitry used for controlling transmissions by one or more antennas and/or for generating signals to be transmitted by an antenna or antennas and/or processing received signals.

In the exemplary apparatus 100 shown in FIG. 1, the dielectric layer 110 between the antennas 102, 104, 102' and 104' and the signal feed layers which are conductive layers of the set 150 of layers [150] and supply signals to/from the antennas, has a higher dielectric constant than air. This leads to lower antenna bandwidth than if air could be used to replace at least a portion of the layer 110.

Figure 2:
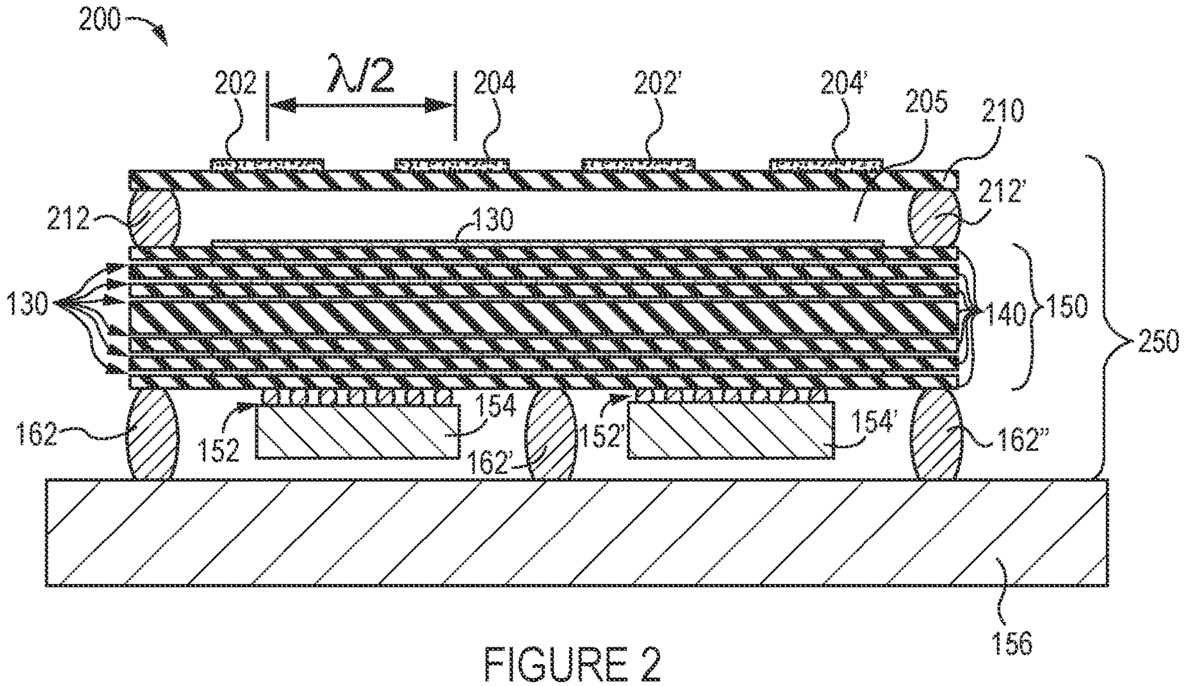
FIG. 2 illustrates a side or cut away view of an apparatus including an exemplary antenna assembly including multiple antennas and integrated circuits, sometimes referred to as an antenna package, mounted on a printed circuit board in accordance with one embodiment of the invention.

FIG. 2 illustrates a side, e.g., cut away view, of an apparatus 200 including an exemplary antenna assembly 250 including multiple antennas 202, 204, 202', 204' and integrated circuits 154, 154', sometimes referred to as an antenna package, mounted on a printed circuit board in accordance with one embodiment of the invention. The antenna assembly 250 will be referred to as an antenna package since it can be treated as a package or assembly that can be included in a larger device, e.g., by mounting it on a printed circuit board 156. In the FIG. 2 embodiment, many of the components and layers are the same or similar to those describe with regard to FIG. 1. For example, the antenna package 250 includes a set 150 of layers which includes conductive layers 130 and dielectric layers 140 and various integrated circuits 154, 154'. The dielectric layers 140 serve as non-conductive layers.

Significantly, in the FIG. 2 embodiment the dielectric layer 110 is replaced with an antenna support layer 210 and support layer mounting bumps 212, 212'. The antenna support layer 210 may be, and sometime is, made of a dielectric material through which antenna connections are made to the lower conductive layers 130. The antennas 202, 204, 202' and 204' are supported above the top of the set 150 of conductive layers 130 and dielectric layers 140 by the bumps or balls 212, 212' of the assembly 250. Given the antenna support arrangement of FIG. 2, an air gap 205 exists beneath the antennas 202, 204, 202', 204'. In some but not necessarily all embodiments a portion of the antennas 202, 204, 202', 204' extend through the antenna support layer 210 into this air gap 205. Since the antenna package 250 includes air between the layers, in the set 150 of layers and the antenna support layer 210 a higher antenna bandwidth can be supported than in the case of the FIG. 1 embodiment since air has a low dielectric constant as compared to the dielectric layer 110. The layers, in the set of layers 150, act as feed layers. The FIG. 2 embodiment with the air gap 205 is well suited for wide bandwidth applications and can support wider bandwidth applications than the FIG. 1 embodiment assuming similar sizes of and spacing of components. In the FIG. 2 embodiment the antenna package 250 is secured to the printed circuit board 156 by bumps 162, 162', 162" with the integrated circuits 154, 154' being coupled to conductive layers by conductors 152, 152' respectively.

In some embodiments the antennas 202, 204, 202', 204' include both vertically polarized antenna elements and horizontally polarized antenna elements. However, the including of vertical and/or horizontally polarized elements in one or more of the antennas 202, 204, 202', 204' can vary depending on the particular application for which the antenna package is designed or used. For example, the antennas may include only vertically polarized antenna elements in some embodiments, only horizontally polarized antenna elements in other embodiments or different antennas can include different combinations of horizontally and vertically polarized elements. Accordingly, the antenna package can be implemented with a wide range of flexibility in terms of the orientation of antenna elements included in the antennas of a particular package 250.

In the FIG. 2 example the center to center spacing between antennas is set to 2/2 where 2 refers to the wavelength of the signal to be transmitted. It should be appreciated that the FIG. 1 and FIG. 2 views are side or cross sectional views and that the apparatus can include additional rows of antennas and integrated circuits. In at least some such embodiments the center to center spacing of antennas is maintained in both directions of the plane in which the antennas are mounted on the antenna support layer 210 which can be in the form of a mounting board.

Figure 3:
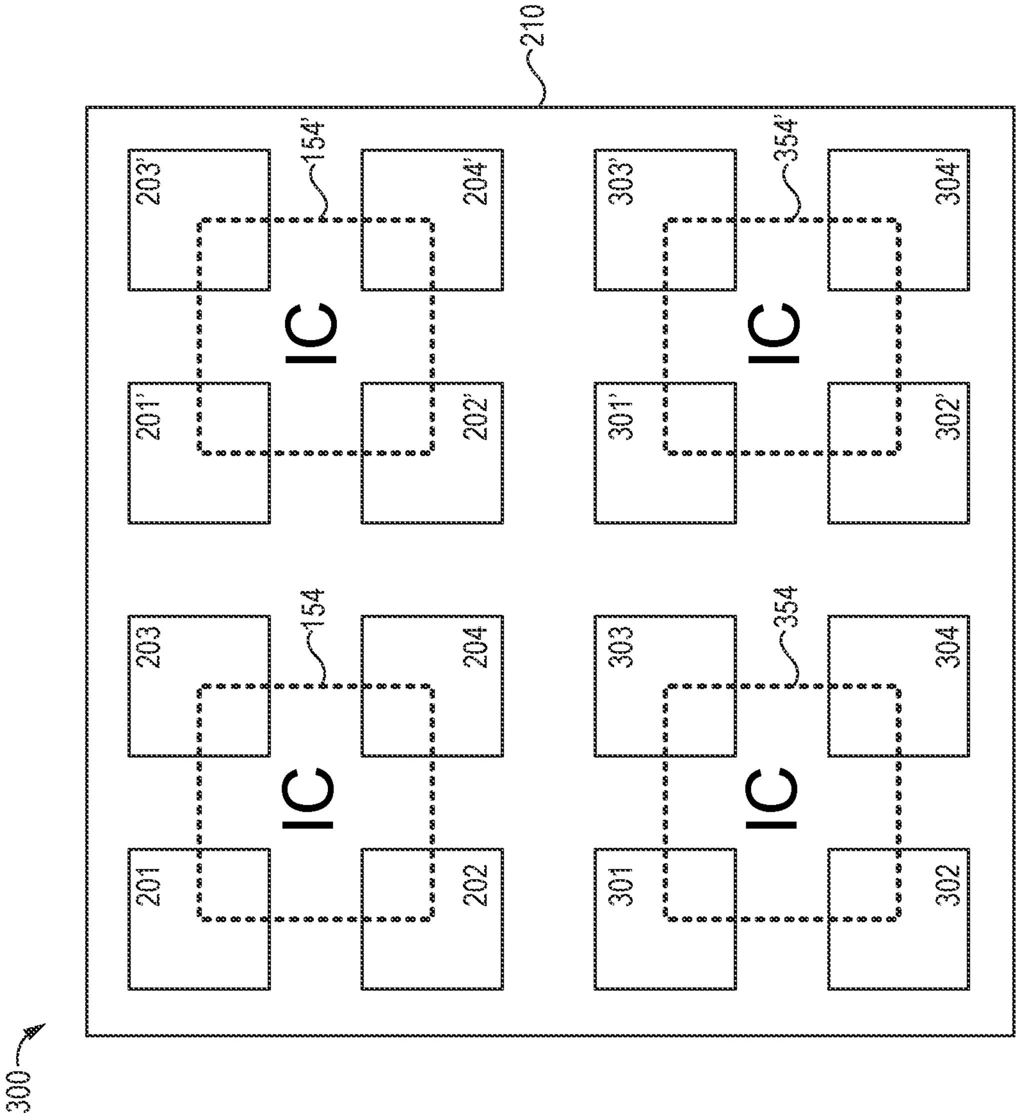
FIG. 3 illustrates a top down view of the apparatus shown in FIG. 2.

FIG. 3 shows a top view 300 of the exemplary apparatus 200 and represents what will be observed if one were to look down at the top of the apparatus 200. In the FIG. 3 top view 300 dashed lines are used to show the locations of integrated circuits which would not be visible looking down on the antenna support layer 210 but which are useful to understand in terms of position from an overall structure perspective.

Note that in FIG. 3, it can be seen that the apparatus 200 includes multiple antennas 201, 202, 203, 204, 201', 202' 203', 204', 301, 302, 303, 304, 301', 302', 303', 304' for a total of 16 antennas in the FIG. 3 example. Note that the antennas form a grid pattern and are uniformly spaced in the rows and columns, e.g., at a λ/2 center to center spacing between adjacent antennas in a row or column. The ICs 154, 154', 354, 354' process signals transmitted to or received by the antennas above the IC and/or control whether an antenna is used to receive or transmit signals at any given time. For example, in some embodiments IC 154 processes signals to be transmitted from antennas 201, 202, 203, 204 and/or are received from these antennas while IC 154' processes signals to be transmitted from antennas 201', 202', 203', 204' and/or are received from these antennas. Note that the exemplary antenna arrangement and support layer 210 are square in the FIG. 3 embodiment which shows the top of antenna package 250. This symmetry is not mandatory but facilitates combining of multiple such antenna packages 250 into larger arrays by mounting multiple packages 250 on a single circuit board next to each other along either side of the antenna package 250 such as shown in FIG. 4.

Figure 4:
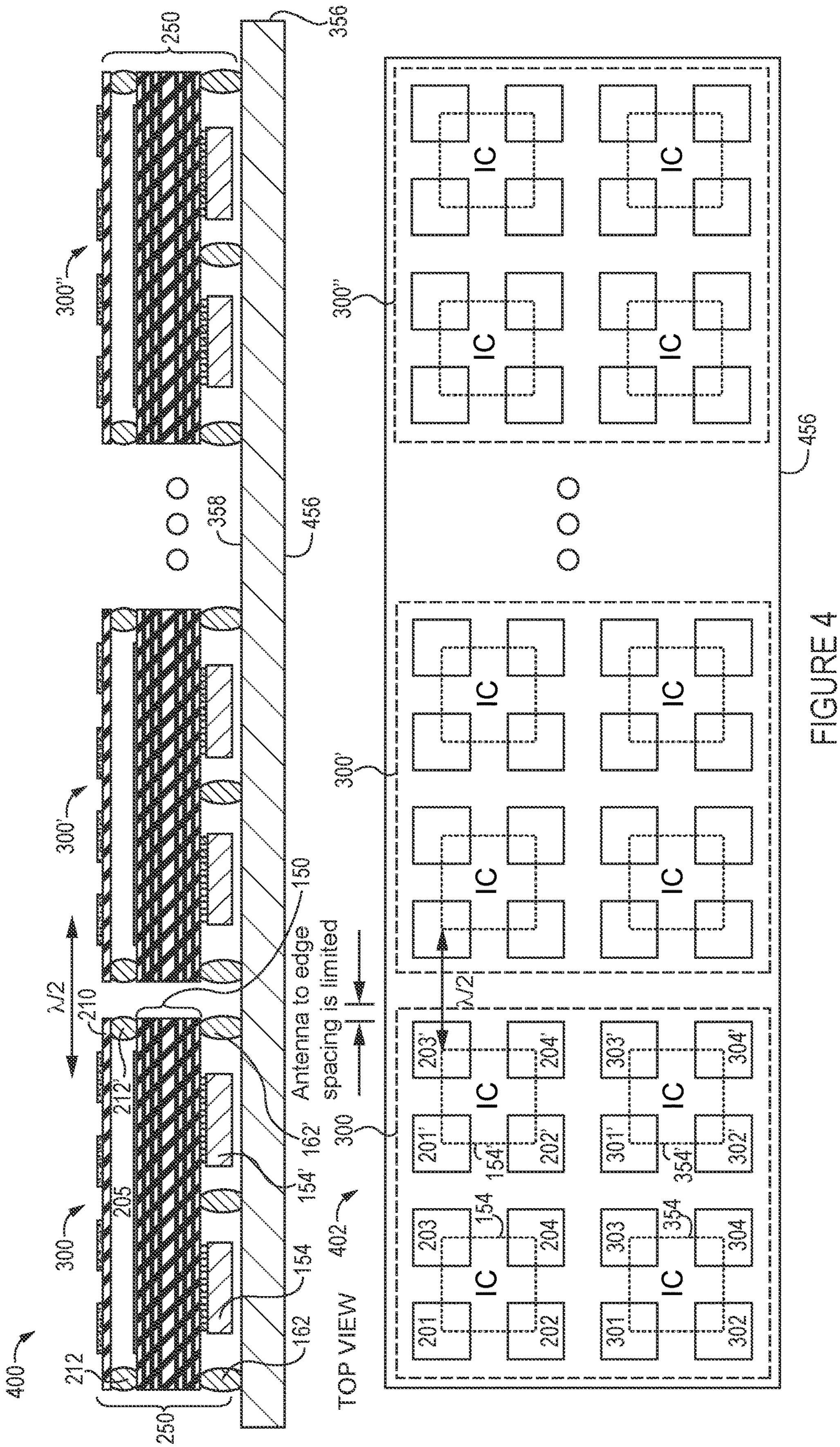
FIG. 4 shows another exemplary apparatus including multiple antenna packages, which are the same as or similar to the one shown in FIG. 2, mounted on a printed circuit board to form a communications device including a large number of antennas.

In FIG. 4, N antenna packages are shown arranged in a row on a printed circuit board 456. Prime's are added to a reference number to show an additional element which is the same or similar to the element identified by the reference number without the prime. For example, antenna packages 300', 300" are second and third antenna packages which are the same as the first antenna package 300. It should be noted that 300 and 250 are used to refer to antenna packages but with 300 being used when the reference number is directed to the top or a top view of the antenna package while 250 is used when a side or cross-section of the antenna package is shown.

In the FIG. 4 example, multiple antenna packages 300, 300', 300" are mounted to the top 358 of the printed circuit board 456. While the antenna packages 300, 300' and 300" are arranged in a row, it should be appreciated that the λ/2 spacing between antennas in a row of the overall array created by the FIG. 4 arrangement is maintained by keeping the antenna to package edge spacing equal to or less than λ/2 and by mounting the packages 250 on the circuit board 456 so that the center to center spacing from the last antenna in a row of one package to the first antenna in the adjacent package will be λ/2.

Thus, it should be appreciated from the FIG. 4 example that large antenna arrays are formed in some embodiments by tiling antenna packages 250 across a circuit board or other mounting surface. Tiling can be implemented in one or both directions. accordingly, while tiling is shown in one direction in the FIG. 4 example an additional set of tiles can be placed adjacent the first set of tiles to form an array of twice the size, e.g., with a second row of tiles above the antenna tiles shown in FIG. 4.

Figure 5:
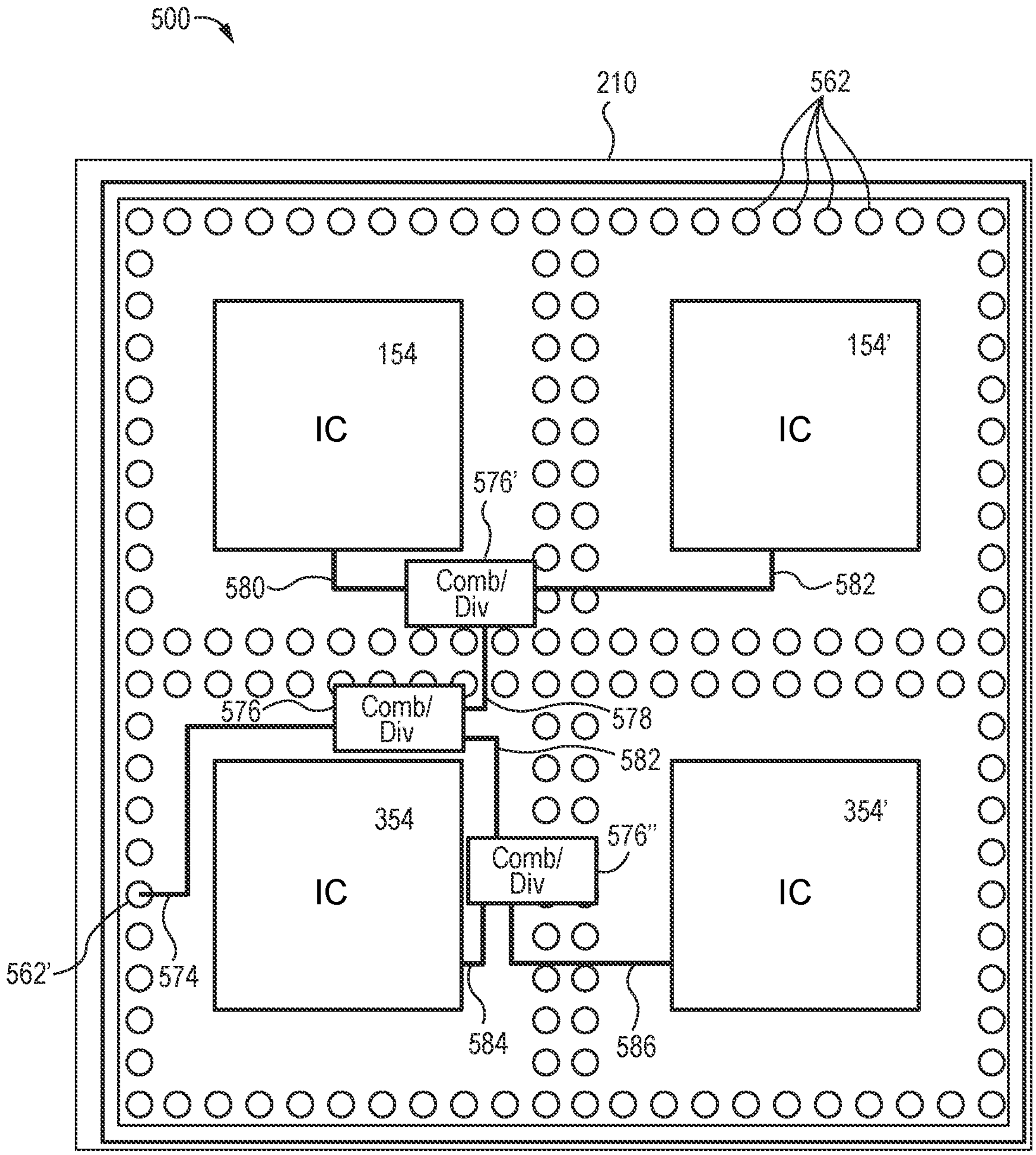
FIG. 5 is a diagram showing how combiner/divider circuits can be combined and integrated into an antenna package of the type shown in FIG. 2 with a single electrical conductor being used as an input to supply signals to multiple ICs.

FIG. 5 shows a representation 500 of a portion of the antenna package 250 and how a single conductor represented by one of the individual circles 562 can be used to supply or communicate signals to multiple ICs 154, 154', 354, 354' which in turn can supply signals to their corresponding antennas. In the FIG. 5 example a single conductor, e.g., pin, bump or ball 562' of the antenna package 250 serves as the signal interface to multiple signal combiner and/or divider circuits 576, 576', 576" which are connected together by conductive lines 574, 578, 580, 582, 584, 586 as shown in FIG. 5. The conductive lines are signal pathways formed on one or more of the conductive layers 130 of the set of layers 150. Circles 562 in FIG. 5 represent bumps of the antenna package assembly 250 which interconnect one or more layers 130.

Figure 6:
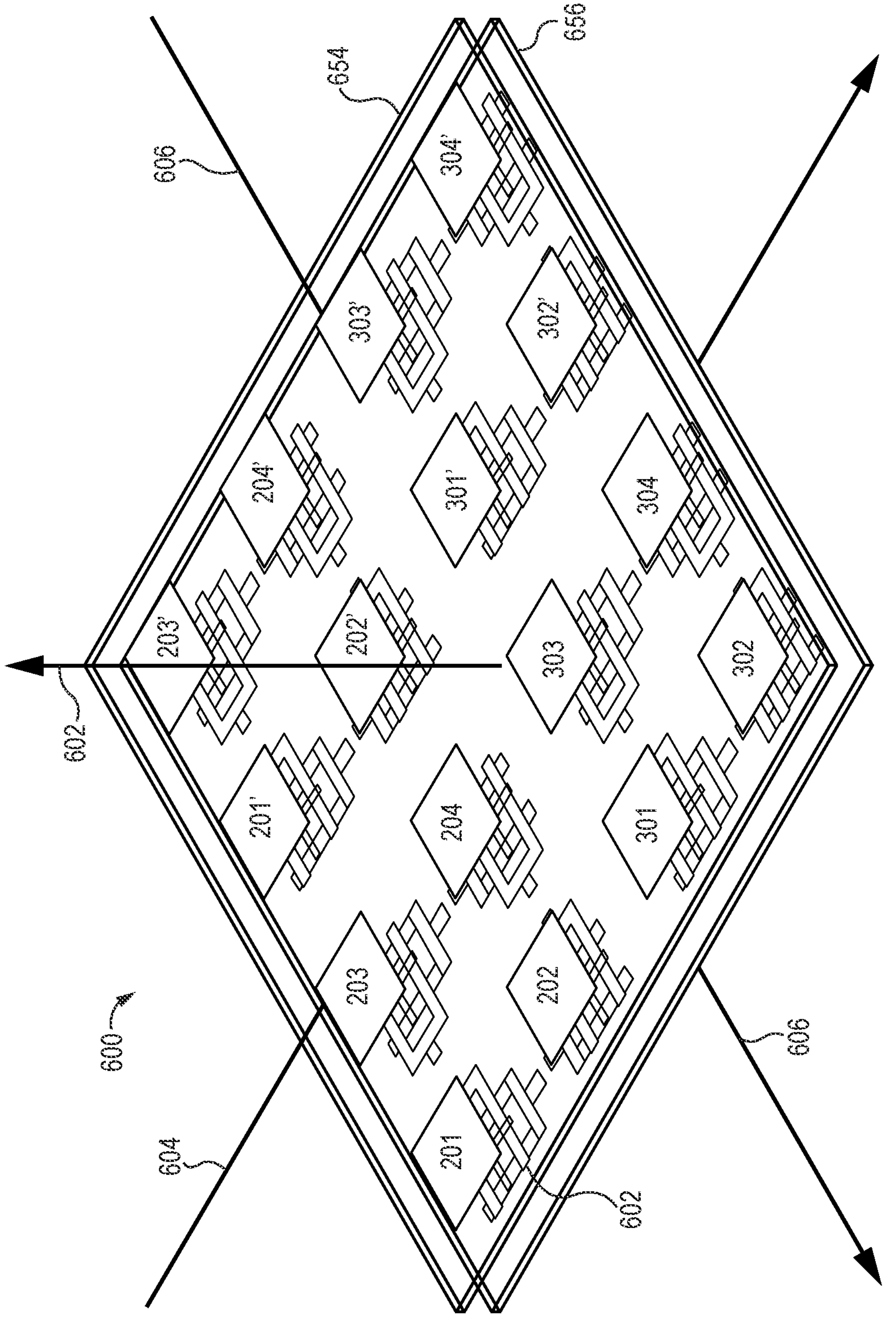
FIG. 6 is an angled view of a pattern of antennas as part of an exemplary antenna package such as the one shown in FIG. 2 with conductive layers and connections beneath the antennas, e.g., included on conductive layers of the BGA package.

FIG. 6 is an angled view of a pattern of antennas as part of an exemplary antenna package 250 such as the one shown in FIG. 2 with conductive layers and connections beneath the antennas, e.g., included on conductive layers of the BGA package. Reference numbers 654, 656 are used to identify layers of the assembly 250 while arrows 602, 604, 606 are used to show axis in 3 different dimensions. Note that the antennas are in the plane defined by the horizontal axis 604, 606.

An antenna 204 surrounded by neighboring antenna 201, 203, 201', 202', 301', 303, 301, 202 may have a different antenna signal pattern than an edge antenna 201 due to the neighbor antennas providing a minor obstruction and/or otherwise interacting with the antenna 204. This can be undesirable in cases where the same or similar antenna patterns are desired for the different antennas in an array.

Figure 7:
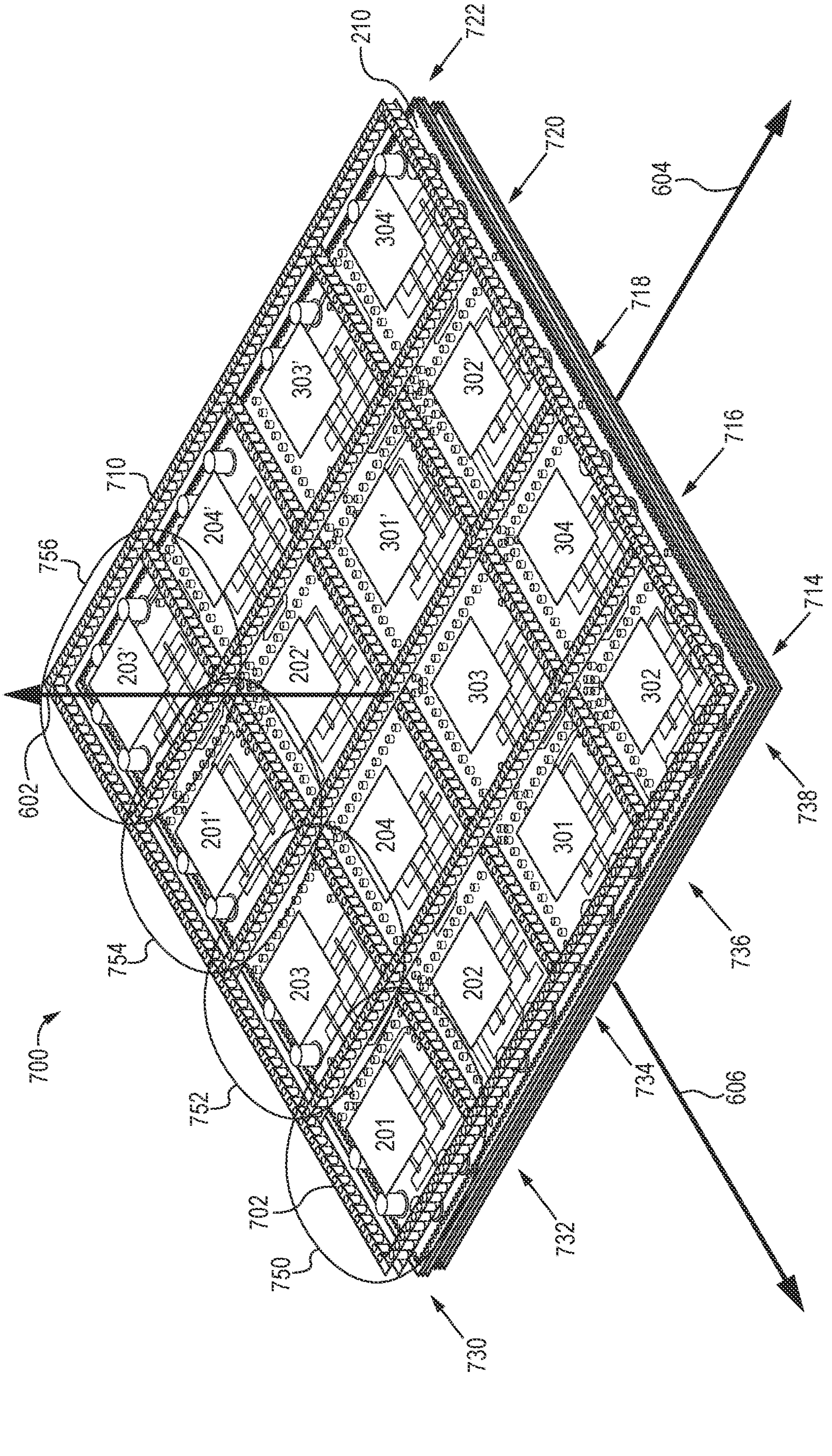
FIG. 7 shows an antenna package with an antenna arrangement similar to that shown in FIG. 6 but with the addition of conductive boundary walls around the antennas in the arrangement to facilitate consistent antenna patterns when multiple antenna packages are mounted together on a printed circuit board as shown in FIG. 4.

FIG. 7 is a drawing 700 showing an antenna package with an antenna arrangement similar to that shown in FIG. 6 but with the addition of conductive boundary walls generally indicated by the reference number 710. The boundary walls 710 extend above the antenna mounting layer 210 and thus above the surface of antenna mounting layer 210. The boundary walls 710 may be, and sometimes are, included as part of the antenna package 250 shown in FIG. 2. The boundary walls 710 form a grid arrangement of row 730, 732, 734, 736, 738 and column 714, 716, 718, 720, 722 boundary walls which form cells around individual antennas. For space reasons the cells of the first row are identified using reference numbers 750, 752, 754, 756. Antenna 201 is at the center of cell 750, antenna 203 is at the center of cell 752, antenna 201' is at the center of cell 754 and antenna 203' is at the center of cell 756. While the other antennas 202, 204 202', 204', 301, 303, 301', 303', 302, 304, 302' and 304' are each in a cell created by the boundary walls for space reasons such cells are not separately numbered in FIG. 7. In one exemplary embodiment designed to transmit and/or receive 39 GHz signals the X and Y dimensions of a cell are approximately 3.75 mm with the width, i.e., thickness, of an individual wall of the cell being 0.25 mm and the height of the boundary wall being approximately 0.3 mm. Thus, in some embodiments the overall XY dimension of a fence cell is 3.75 mm×3.75 mm with the boundary wall's width and height being 0.25 mm and 0.3 mm respectively.

Thus, the apparatus shown in FIG. 7 and represented by reference number 700, includes first conductive grid 702 formed from a set of conductive boundary walls 714, 716, 718, 720, 722, 730, 732, 734, 736, 738 positioned on a top surface of said support layer 210. The conductive boundary walls forming a pattern of raised rectangular antenna surrounds 750, 752, 754, 756, each rectangular antenna surround, e.g., 750, 752, 754, 756, having an antenna, e.g., 201, 203, 201', or 203', at its center. Note that in the FIG. 7 example each of the antennas of the antenna assembly are uniformly spaced from one another with each antenna being positioned at the center of one of a corresponding raised rectangular antenna surrounds formed by the intersection of the conductive boundary walls 714, 716, 718, 720, 722, 730, 732, 734, 736, and/or 738. The antennas are spaced apart from one another with a λ/2 spacing where λ corresponds to the wavelength of a frequency to be transmitted by the antennas. The conductive grid 702, also sometimes identified by the reference number 710, in the FIG. 7 example is a square grid with the rectangular antenna surrounds 750, 752, 754, 756 of said conductive grid 702 being square in shape. The conductive boundary walls can be, and sometime are, formed by conductive bumps of the antenna package 250 which extend through the support layer 210 and/or one or more other layers of the antenna package 250. Since the boundary wall 702 is formed by bumps or pins extending through a layer of the antenna package 250 in some embodiments, the boundary wall 710 is sometimes referred to as a via array or segmented via array. The boundary wall 710 is also sometimes referred to as a fence or boundary fence since it has the appearance of a fence sounding the antennas. The use of the boundary fence 710 establishes desired boundary conditions around the antennas in some embodiments. By placing the boundary fence 710 around antennas in some embodiments the antenna package 250 is able to establish uniform or relatively uniform antenna patterns across the antennas of the array represented by the antenna package 250.

By creating a somewhat uniform conductive boundary around the side of each of the antennas in the assembly 250 the antenna pattern of an inner antenna 204 will be more similar to the antenna pattern of an outer antenna 201 than would be the case if the boundary wall or fence 710 were not used. By using the boundary fence 710 consistent antenna patterns across the array can be achieved without having to increase the spacing between antennas. Thus, a compact array implementation is possible with relatively uniform antenna patterns.

While not shown in the other figures it should be appreciated that the boundary fence 710 is included in the antenna packages shown in the other figures in at least some embodiments implemented in accordance with the present invention. However, the boundary wall is not necessarily included in all embodiments. Thus, the boundary fence 710 is an optional feature included in at least some embodiments of the invention.

Figure 8:
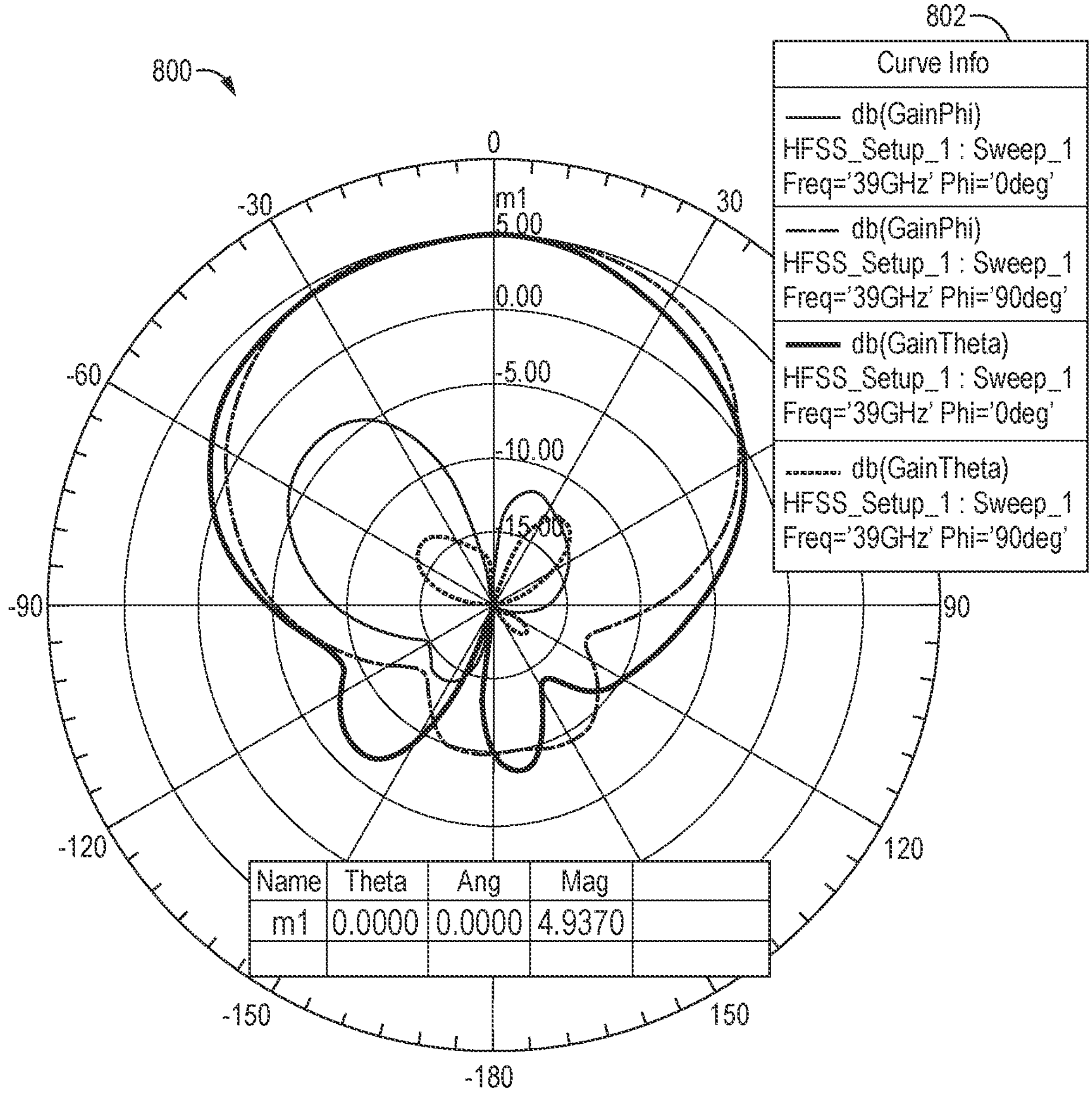
FIG. 8 shows an exemplary antenna pattern achieved by an antenna of the arrangement shown in FIG. 7.

FIG. 8 shows an antenna pattern 800 predicted by modeling of an antenna of the antenna assembly shown in FIG. 7. Key 802 includes information useful in interpreting the antenna pattern 800.

FIGS. 9-12 show various ways of incorporating a heat sink into an apparatus including an antenna package 250. Supporting of good heat flow to a heat sink reduces the risk of an undesirable rise in temperature of the ICs as they operate. Supporting heat dissipation in a small area can be challenging particularly given the compact nature of the array 250.

It should be appreciated that heat sinks are often made of metal or another heat conductive material. Placing a heat sink directly on top of the antennas would interfere with antenna performance. Accordingly, there is a need for a method and/or arrangement to conduct heat away from the ICs 154, 154' in the antenna package without placing the heat sink on top of the antennas 202, 204, 202', 204'. FIGS. 9 through 12 show various arrangement where a heat sink 910 is positioned below a circuit board on which an antenna package is mounted with a heat conducting assembly 906, 1006, 1102 or 1202 being used to conduct heat from the ICs 154, 154' of the antenna package 250 to the heat sink 910.

Figure 9:
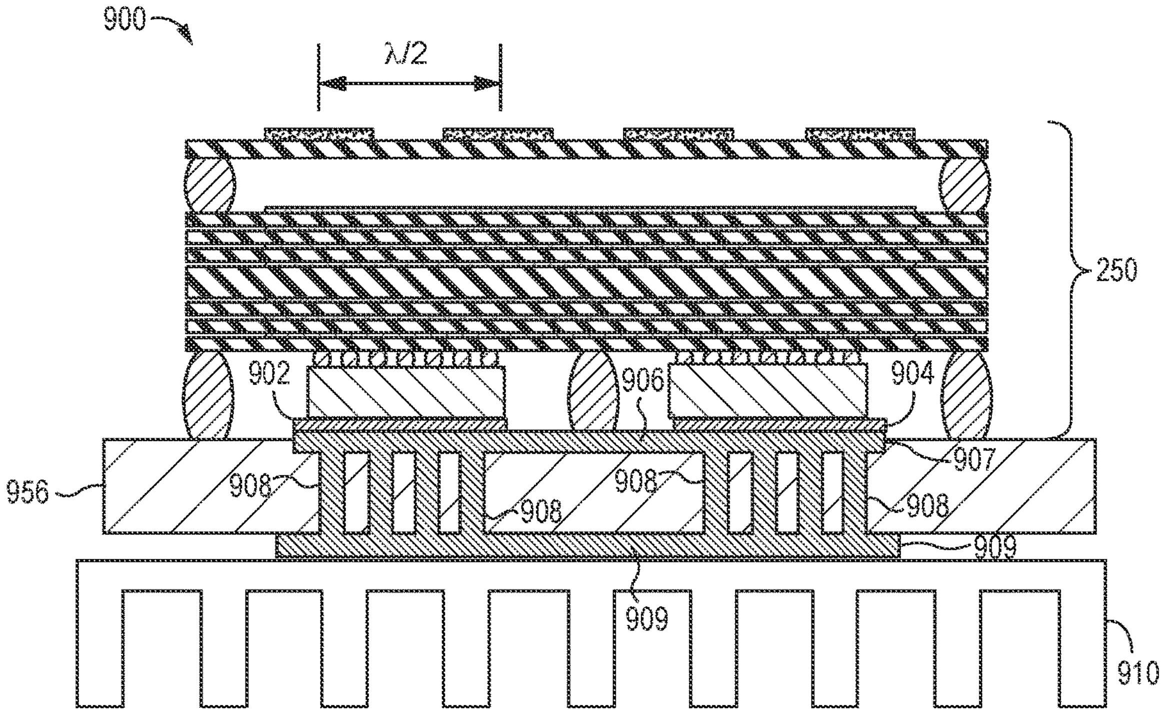
FIG. 9 shows a first exemplary antenna package and heat sink arrangement.

FIG. 9 shows a first exemplary antenna package and heat sink arrangement 900 in which a heat conductive assembly 906 includes an upper flat conductive element 907 coupled to a lower flat conductive element 909 by one or more vertical heat conducting elements 908. Heat conductive grease or another thermally conductive material or compound 902, 904 is used to ensure good thermal conductivity between the integrated circuits 154, 154' and the heat conductive assembly 906. The heat conductive assembly 906 is made of metal or another heat conductive material and is in thermal contact with the heat sink 910. Vertical element 908 extend through the printed circuit board 956 allowing heat to be conducted through the printed circuit board. In the FIG. 9 example the heat conductive assembly 906 includes multiple vertical heat conducting elements 908 positioned directly under each of multiple integrated circuits and extending through different holes in the printed circuit board.

Figure 10:
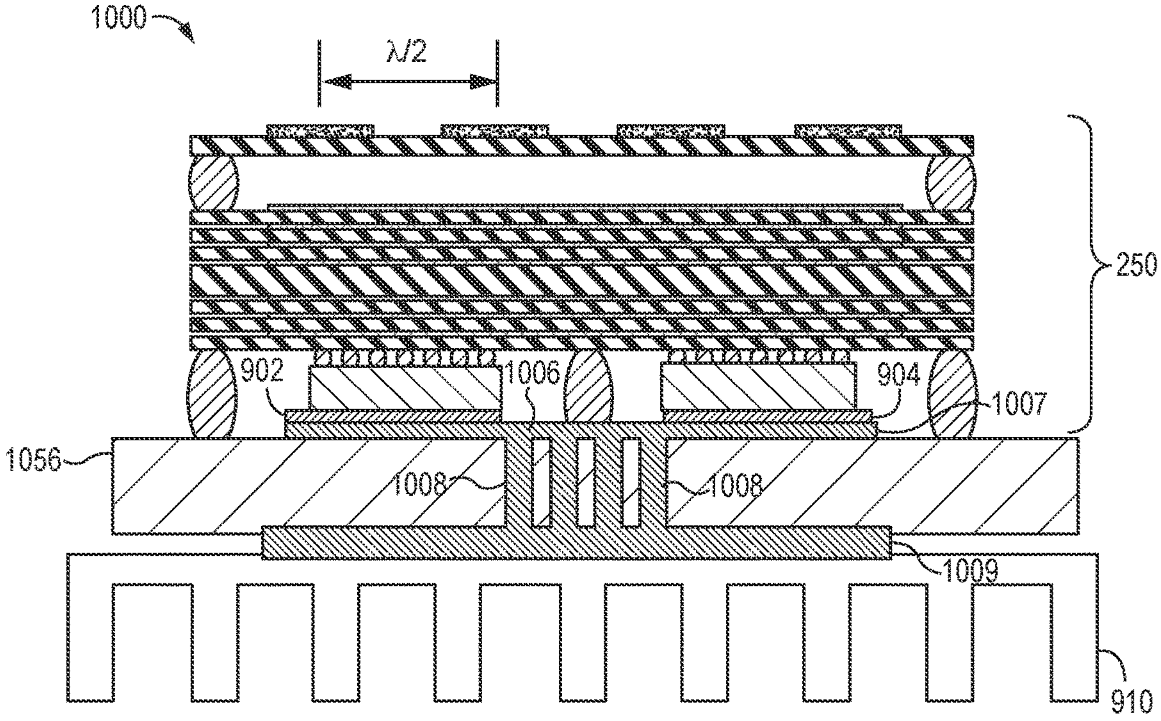
FIG. 10 shows a second exemplary antenna package and heat sink arrangement.

FIG. 10 shows a second exemplary antenna package and heat sink arrangement 1000 in which a heat conductive assembly 1006 is implemented using an upper conductive plate 1007, a lower conductive plate 1009 and a centrally positioned set of vertical heat conductive elements 1008. In the FIG. 10 example, the heat conductive assembly 1006 includes multiple vertical heat conducting elements 1008 positioned at a location corresponding to a region that its at least partially below an area that corresponds to a gap between first and second integrated circuits 154, 154' which are adjacent each other. In this arrangement the vertical elements 1008 form a heat via array through the printed circuit board 1056 while the vertical elements 1008 are positioned at a location in the printed circuit board 1056 that is less important to the routing of connections to ICs that the areas directly under the chips. The plate 1007 extends out to make thermal contact with the surface of the chips and in some embodiments is wider at the area under the chips than at the center region where the vertical heat conductors 1008 are located. However, in other embodiments plate 1007 is of uniform width. This in some embodiments the plate 1007 is not uniform in width in all locations even though that fact may not be clear from the cross section shown in FIG. 10. In some embodiments corresponding to the FIG. 10 example, a top layer of the printed circuit board 1056 interfaces to multiple, e.g., all four ICs in the package 250.

Figure 11:
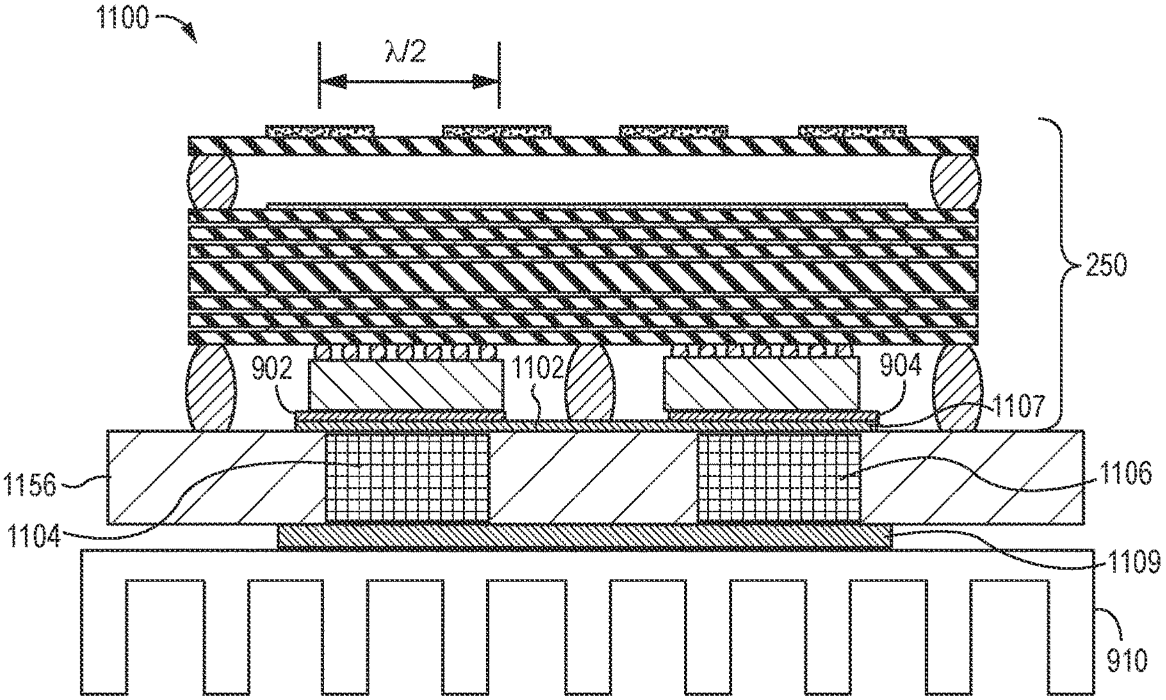
FIG. 11 shows a third exemplary antenna package and heat sink arrangement.

FIG. 11 shows in an embodiment where metal conductors, e.g., round copper coin shaped elements 1104, 1106 are pressed into the printed circuit board 1156 to operate as vertical heat conducting elements to transfer heat between upper plate 1107 and lower plate 1109 of the heat transfer assembly 1102. A metal coin, e.g., a copper coin, e.g., disc, can be, and sometimes is, included for each IC with the coin 1104, 1106 being positioned below the IC 154, 154' to which it corresponds. In this way a large amount of heat can be transferred through the printed circuit board 1156 from each IC 154, 154'.

Figure 12:
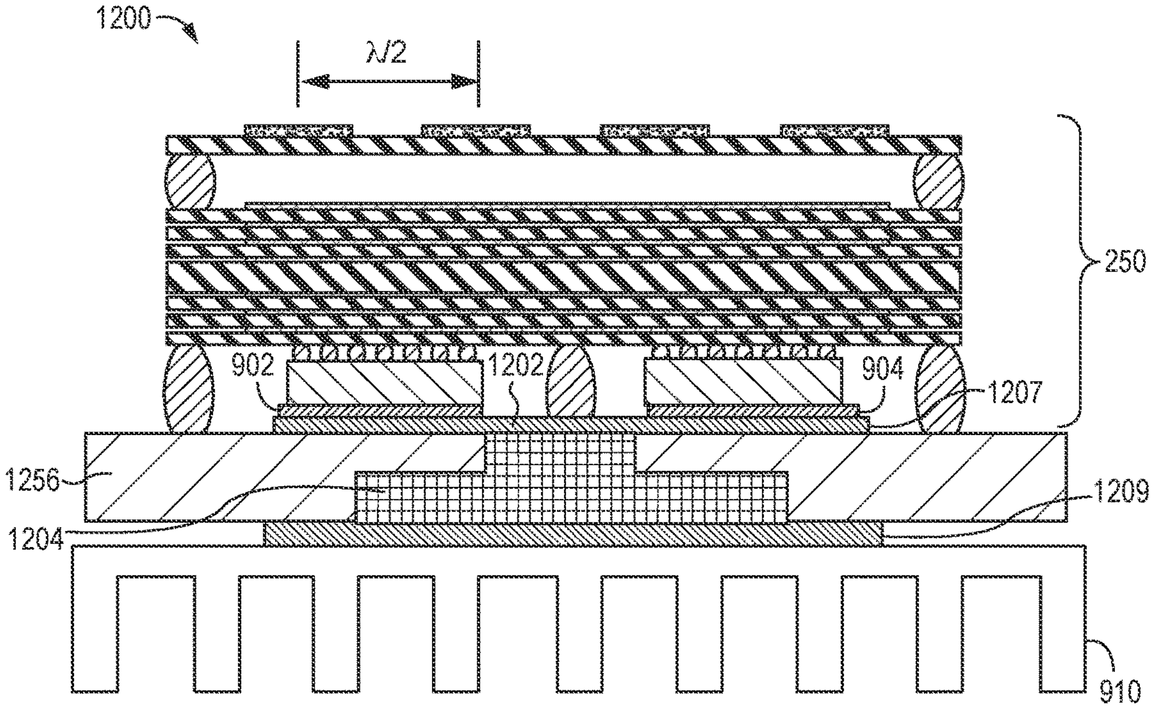
FIG. 12 shows a fourth exemplary antenna package and heat sink arrangement.

FIG. 12 shows another possible arrangement for a heat conductor assembly. In FIG. 12 embodiment the heat conductor assembly 1202 includes an upper heat conductive plate 1207, an inverted T shaped copper coin assembly 1204 and a lower heat conductive plate 1209. The T shaped copper coin assembly 1204 can be implemented as a single copper slug which is pressed into the printed circuit board 1256. This approach has the advantage of leaving more room for routing of conductive paths through the upper layer(s) of the printed circuit board than the FIG. 11 embodiment provides. In the FIG. 12 example, the heat conductive assembly 1202 includes an upper flat conductive element 1207 coupled to a lower flat conductive element 1209 by a t shaped conductor 1204 which has a larger conductive area in contact with the lower flat conductive element 1209 than the upper flat conductive element 1207. The conductive elements 1207, 1209, 1204 are made of a metal such as copper or aluminum in some embodiments.

The techniques of various embodiments may be implemented using software, hardware and/or a combination of software and hardware. Various embodiments are directed to apparatus and/or systems, e.g., wireless communications systems, wireless terminals, user equipment (UE) devices, access points, e.g., a WiFi wireless access point, a cellular wireless AP, e.g., an eNB or gNB, user equipment (UE) devices, a wireless cellular systems, e.g., a cellular system, WiFi networks, etc. Various embodiments are also directed to methods, e.g., method of controlling and/or operating a system or device, e.g., a communications system, an access point, a base station, a wireless terminal, a UE device, etc. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements or steps are implemented using hardware circuitry.

In various embodiments nodes and/or elements described herein are implemented using one or more components to perform the steps corresponding to one or more methods, for example, controlling, establishing, generating a message, message reception, signal processing, sending, communicating, e.g., receiving and transmitting, comparing, making a decision, selecting, making a determination, modifying, controlling determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a wireless communications device including a multi-element antenna array supporting beam forming, such as a cellular AP or Wifi AP, a wireless terminal, a UE device, etc., including a processor configured to implement one, multiple or all of the steps of one or more methods of the invention.

In some embodiments, the processor or processors, e.g., CPUs, of one or more devices, are configured to perform the steps of the methods described as being performed by the devices, e.g., communication nodes. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., access point, with a processor which includes a component corresponding to each of the steps of the various described methods performed by the device in which the processor is included. In some but not all embodiments a device, e.g., wireless communications node such as an access point or base station, includes a component corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above. Depending on the embodiment, the computer program product can, and sometimes does, include different code for each step to be performed. Thus, the computer program product may, and sometimes does, include code for each individual step of a method, e.g., a method of controlling a wireless communications device such as an access point. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a wireless communications device such as an access point described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

NUMBERED LIST OF EXEMPLARY APPARATUS EMBODIMENTS

Apparatus Embodiment 1

An apparatus (200, 400, 700, 900, 1000, 1100 or 1200), comprising: a first antenna assembly (250, 300, 300' or 300"), the first antenna assembly including: a first plurality of antennas (201, 202, 203, 204, 201', 202', 203', 204', 301, 302, 303, 304, 301', 302', 303', 304') mounted on a support layer (210) in a grid pattern; a first set (150) of conductive layers (130) and dielectric layers (140) positioned beneath said support layer (210) and separated from said support layer (210) by an air gap (205); and a first plurality of integrated circuits (154, 154', 354, 354') mounted beneath said set (150) of conductive layers (130) and dielectric layers (140).

Apparatus Embodiment 2

The apparatus of Apparatus Embodiment 1, wherein said first support layer (210) and said first set (150) of conductive layers (130) and dielectric layers (140) are layers of a ball grid array (BGA) and wherein balls (212, 212') of said ball grid array support said support layer (210) above said first set (150) of conductive layers (130) and dielectric layers (140) with said air gap (205) being created by a space between said support layer (210) and said first set (150) of conductive layers (130) and dielectric layers (140).

Apparatus Embodiment 3

The apparatus of Apparatus Embodiment 2, wherein a single conductive element (562') (e.g., a ball of the ball grid array) serves as a signal input that is coupled to a plurality of integrated circuits (154, 154', 354, 354') (see FIG. 5) by at least one signal combiner or divider circuit (576).

Apparatus Embodiment 4

The apparatus of Apparatus Embodiment 1, wherein at least some of said antennas (201, 202, 203, 204, 201', 202', 203', 204', 301, 302, 303, 304, 301', 302', 303', 304') include a vertically polarized antenna element.

Apparatus Embodiment 5

The apparatus of Apparatus Embodiment 4, wherein at least some of said antennas (201, 202, 203, 204, 201', 202',

203', 204', 301, 302, 303, 304, 301', 302', 303', 304') further includes a horizontally polarized antenna element.

Apparatus Embodiment 6

The apparatus of Apparatus Embodiment 1, wherein each the antennas (201, 202, 203, 204, 201', 202', 203', 204', 301, 302, 303, 304, 301', 302', 303', 304') includes a vertically polarized antenna element.

Apparatus Embodiment 6A

The apparatus of Apparatus Embodiment 1, wherein each of the antennas (201, 202, 203, 204, 201', 202', 203', 204', 301, 302, 303, 304, 301', 302', 303', 304') includes a horizontally polarized antenna element.

Apparatus Embodiment 6B

The apparatus of Apparatus Embodiment 1, wherein each of the antennas (201, 202, 203, 204, 201', 202', 203', 204', 301, 302, 303, 304, 301', 302', 303', 304') includes both a vertically polarized antenna element and a horizontally polarized antenna element.

Apparatus Embodiment 7

The apparatus of Apparatus Embodiment 1, further comprising: a circuit board (156, 356, 456, 956, 1056, 1156, or 1256) on which said first antenna assembly (250) is mounted.

Apparatus Embodiment 8

The apparatus of Apparatus Embodiment 7, further comprising: a second antenna assembly (300') mounted on said circuit board (156, 356, 456, 956, 1056, 1156, or 1256) positioned on said circuit board (156, 356, 456, 956, 1056, 1156, or 1256) next to said first antenna assembly (250 or 300).

Apparatus Embodiment 9

The apparatus of Apparatus Embodiment 8, wherein an antenna center to center (λ/2) spacing between antennas (203', 204', 303', 304') in a last column of the first antenna assembly (300) and antennas in a first column of the second antenna assembly (300') is the same as the center to center spacing between antennas (201, 203, 201', 203') in the first row of antennas in the first and second antenna assemblies (300, 300').

Apparatus Embodiment 10

The apparatus of Apparatus Embodiment 9, wherein the antenna center to center (λ/2) spacing is λ/2 where λ is the wavelength of a frequency of signals the antenna assembly (300 or 300') is intended to transmit or receive.

Apparatus Embodiment 10A

The apparatus of Apparatus Embodiment 10, wherein a center to center spacing between adjacent antennas (201, 202, 301, 302) in a first column of the first antenna assembly (300) is the same as the antenna center to center (λ/2) spacing between antennas (203', 204', 303', 304') in a last column of the first antenna assembly (300).

Apparatus Embodiment 11

The apparatus (200, 400, 700, 900, 1000, 1100 or 1200) of Apparatus Embodiment 2, wherein the first antenna assembly 250 further includes: a first conductive grid (702) formed from a set of conductive boundary walls (714, 716, 718, 720, 722, 730, 732, 734, 736, 738) positioned on a top surface of said support layer (210), said conductive boundary walls forming a pattern of raised rectangular antenna surrounds (750, 752, 754, 756), each rectangular antenna surround (750, 752, 754, 756) having an antenna (201, 203, 201', or 203') at its center.

Apparatus Embodiment 12

The apparatus of Apparatus Embodiment 11, wherein each of the antennas of said first antenna assembly (250 or 300) are uniformly spaced from one another with each antenna being positioned at the center of a corresponding raised rectangular antenna surround formed by the intersection of conductive boundary walls (714, 716, 718, 720, 722, 730, 732, 734, 736, 738).

Apparatus Embodiment 13

The apparatus of Apparatus Embodiment 12, wherein the antennas are spaced apart from one another with a λ/2 spacing where λ corresponds to the length of the wavelength of a frequency to be transmitted by the antennas.

Apparatus Embodiment 14

The apparatus of Apparatus Embodiment 12, wherein said first conductive grid (702) is a square grid and wherein the rectangular antenna surrounds (750, 752, 754, 756) of said first conductive grid (702) are square in shape.

Apparatus Embodiment 15

The apparatus (200, 400, 700, 900, 1000, 1100 or 1200) of Apparatus Embodiment 11, further comprising: a heat sink (910); and a heat conductive assembly (906, 1006, 1102 or 1202) including one or more heat conducting elements extending through the printed circuit board for conducting heat from one or more integrated circuits in said first plurality of integrated circuits to said heat sink (910).

Apparatus Embodiment 16

The apparatus of Apparatus Embodiment 15, wherein the heat conductive assembly (906, 1006, 1102, 1202) includes an upper flat conductive element (907, 1007, 1107 or 1207) coupled to a lower flat conductive element (909, 1009, 1109 or 1209) by one or more vertical heat conducting elements (908, 1008, 1104, 1106, 1204).

Apparatus Embodiment 17

The apparatus of Apparatus Embodiment 16, wherein the heat conductive assembly (906, 1006, 1102 or 1202) includes multiple vertical heat conducting elements (908) positioned directly under each of multiple integrated circuits (154, 154') and extending through different holes in the printed circuit board.

Apparatus Embodiment 18

The apparatus of Apparatus Embodiment 16, wherein the heat conductive assembly (906, 1006, 1102 or 1202) includes multiple vertical heat conducting elements (1008) positioned at a location corresponding to a region that its at least partially below an area that corresponds to a gap between first and second integrated circuits (154, 154') which are adjacent each other.

Apparatus Embodiment 19

The apparatus of Apparatus Embodiment 15, wherein the heat conductive assembly includes an upper flat conductive element (1207) coupled to a lower flat conductive element (909, 1009, 1109 or 1209) by a t shaped conductor (1204) which has a larger conductive area in contact with the lower flat conductive element (909, 1009, 1109 or 1209) than the upper flat conductive element (1207).

What is claimed is:

1. An apparatus comprising:

a first antenna assembly, the first antenna assembly including:

a first plurality of antennas positioned above a dielectric support layer made of a dielectric material, said first plurality of antennas being mounted on a first side of the dielectric support layer in a grid pattern, said dielectric support layer being the first layer beneath said first plurality of antennas and extending beneath said first plurality of antennas, said dielectric support layer separating said first plurality of antennas from an air gap, said dielectric support layer having a second side below said first side which is exposed to said air gap;

a first set of conductive layers and dielectric layers positioned beneath said dielectric support layer and separated from said dielectric support layer by said air gap, said first set of conductive layers and dielectric layers including a first conductive layer having a surface exposed to said air gap and separated from said second side of the dielectric support layer by said air gap; and a first plurality of integrated circuits mounted beneath said first set of conductive layers and dielectric layers.

2. The apparatus of claim 1, wherein said first dielectric support layer and said first set of conductive layers and dielectric layers are layers of a ball grid array (BGA) and wherein balls of said ball grid array support said dielectric support layer above said first conductive layer with said air gap being created by a space between said dielectric support layer and said first conductive layer.

3. The apparatus of claim 2, wherein a single conductive element serves as a signal input that is coupled to the first plurality of integrated circuits by at least one signal combiner or divider circuit.

4. The apparatus of claim 1, wherein at least one antenna in said first plurality of antennas includes a vertically polarized antenna element.

5. The apparatus of claim 4, wherein said at least one antenna in said first plurality of antennas further includes a horizontally polarized antenna element.

6. The apparatus of claim 1, wherein each of the first plurality of antennas includes a vertically polarized antenna element.

7. The apparatus of claim 1, further comprising:

a circuit board on which said first antenna assembly is mounted.

8. The apparatus of claim 7, further comprising:

a second antenna assembly mounted on said circuit board positioned on said circuit board next to said first antenna assembly.

9. The apparatus of claim 8, wherein an antenna center to center spacing between antennas in a last column of antennas in said first antenna assembly and antennas in a first column of said second antenna assembly is the same as the center to center spacing between antennas in the first row of antennas in said first and second antenna assemblies.

10. The apparatus of claim 9, wherein the antenna center to center spacing is $\lambda/2$, where $\lambda$ is the wavelength of a signal the antenna assembly is intended to transmit or receive.

11. The apparatus of claim 2, wherein said first side of the dielectric support layer is a top surface of said dielectric support layer; and wherein the first antenna assembly further includes:

a first conductive grid formed from a set of conductive boundary walls positioned on the top surface of said dielectric support layer, said conductive boundary walls extending out from and above said top surface of said dielectric support layer thereby forming a pattern of raised rectangular antenna surrounds, each rectangular antenna surround surrounding one antenna in said first plurality of antennas.

12. The apparatus of claim 11, wherein each of the antennas of said first plurality of antennas are uniformly spaced from one another with each antenna being positioned at the center of a corresponding raised rectangular antenna surround formed by an intersection of conductive boundary walls in said set of conductive boundary walls.

13. The apparatus of claim 12, wherein antennas in said first plurality of antennas are spaced apart from one another with a $\lambda/2$ spacing where $\lambda$ corresponds to the length of the wavelength of a signal to be transmitted by the antennas.

14. The apparatus of claim 12, wherein said first conductive grid is a square grid and wherein the rectangular antenna surrounds of said first conductive grid are square in shape.

15. The apparatus of claim 11, further comprising:

a heat sink; and a heat conductive assembly including one or more heat conducting elements extending through a printed circuit board for conducting heat from one or more integrated circuits in said first plurality of integrated circuits to said heat sink.

16. The apparatus of claim 15, wherein the heat conductive assembly includes an upper flat conductive element coupled to a lower flat conductive element by one or more vertical heat conducting elements.

17. The apparatus of claim 16, wherein the heat conductive assembly includes multiple vertical heat conducting elements positioned directly under each of the first plurality of integrated circuits and extending through different holes in the printed circuit board.

18. The apparatus of claim 16, wherein the heat conductive assembly includes multiple vertical heat conducting elements positioned at a location corresponding to a region that is at least partially below an area that corresponds to a gap between first and second integrated circuits which are adjacent each other.

19. The apparatus of claim 15, wherein the heat conductive assembly includes an upper flat conductive element coupled to a lower flat conductive element by a t-shaped conductor which has a larger conductive area in contact with the lower flat conductive element than the upper flat conductive element.

20. The apparatus of claim 1, wherein each of the first plurality of antennas is surrounded by conductive pins extending out of the first side of the dielectric support layer, said pins forming conductive boundary walls between different antennas in said first plurality of antennas.

21. The antenna apparatus of claim 20, wherein each of the first plurality of antennas is positioned at a center of a cell formed by the conductive boundary walls.

22. The antenna apparatus of claim 21, wherein each of the first plurality of antennas is in a different cell formed by the conductive boundary walls, each of the cells formed by the conductive boundary walls being a rectangular cell.

23. The antenna apparatus of claim 21, wherein each of the first plurality of antennas is in a different square cell formed by the conductive boundary walls.

24. The antenna apparatus of claim 1, wherein said dielectric support layer is of uniform thickness and has the same thickness in areas located beneath said antennas and areas between said antennas.

25. The antenna apparatus of claim 24, wherein said air gap separates said dielectric support layer from said first conductive layer by a uniform fixed distance.

26. The antenna apparatus of claim 25, wherein said first set of conductive layers and dielectric layers includes an uppermost non-conductive layer of uniform thickness immediately below said first conductive layer.

* * * * *